(12) United States Patent
Panelli et al.

(10) Patent No.: US 7,870,220 B1
(45) Date of Patent: Jan. 11, 2011

(54) METHODS AND APPARATUS FOR ANALYZING VSAN CONFIGURATION

(75) Inventors: John D. Panelli, Campbell, CA (US); Keerthi K. Arutla, Fremont, CA (US); Shankar Kundala, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 880 days.

(21) Appl. No.: 11/640,670

(22) Filed: Dec. 18, 2006

(51) Int. Cl.
*H04L 12/56* (2006.01)
*G06F 15/167* (2006.01)
*G06F 15/16* (2006.01)
*G06F 15/177* (2006.01)
*G06F 15/173* (2006.01)

(52) U.S. Cl. ........................ 709/216; 370/389; 709/219; 709/220; 709/223

(58) Field of Classification Search ................. 709/220, 709/223; 370/389
See application file for complete search history.

(56) References Cited

U.S. PATENT DOCUMENTS

| | | | |
|---|---|---|---|
| 7,523,187 B1 * | 4/2009 | Lavallee et al. | 709/223 |
| 2004/0006612 A1 * | 1/2004 | Jibbe et al. | 709/223 |
| 2005/0018673 A1 * | 1/2005 | Dropps et al. | 370/389 |
| 2006/0041559 A1 * | 2/2006 | Baldwin et al. | 707/10 |
| 2007/0067589 A1 * | 3/2007 | Mishra et al. | 711/163 |
| 2007/0130295 A1 * | 6/2007 | Rastogi et al. | 709/220 |
| 2007/0143552 A1 * | 6/2007 | Rastogi et al. | 711/154 |
| 2008/0270700 A1 * | 10/2008 | Rao et al. | 711/118 |

* cited by examiner

*Primary Examiner*—Man Phan
*Assistant Examiner*—Ryan C. Kavleski
(74) *Attorney, Agent, or Firm*—Krishnendu Gupta; Gerald P. Kazanjian (57) ABSTRACT

A system identifies at least one VSAN, and analyzes a configuration of the VSAN by applying a policy to the configuration of the VSAN. The system then outputs a result of the policy applied to the VSAN.

19 Claims, 8 Drawing Sheets

209 ANALYZE A CONFIGURATION OF THE AT LEAST ONE VSAN BY APPLYING A POLICY TO THE CONFIGURATION OF THE AT LEAST ONE VSAN

210 IDENTIFY AN OBJECT OF THE POLICY INCLUDING AT LEAST ONE OF:
i) THE AT LEAST ONE VSAN,
ii) A PHYSICAL FABRIC COMPRISING AT LEAST ONE PHYSICAL CONNECTION BETWEEN THE PLURALITY OF DEVICES WITHIN THE STORAGE AREA NETWORK,
iii) A SWITCH, AND
iv) AN ARRAY OF DEVICES

OR

211 DETERMINE WHETHER THE AT LEAST ONE VSAN COMPRISES AT LEAST ONE SWITCH OPERABLE WITHIN THE AT LEAST ONE VSAN

OR

212 DETERMINE THAT AT LEAST ONE SWITCH OPERABLE WITHIN ONLY ONE VSAN IS CONNECTED TO THE AT LEAST ONE VSAN AND AT LEAST ONE OTHER VSAN

*FIG. 5*

213 ANALYZE A CONFIGURATION OF THE AT LEAST ONE VSAN BY APPLYING A POLICY TO THE CONFIGURATION OF THE AT LEAST ONE VSAN

214 IDENTIFY A UNIQUE IDENTIFIER ASSOCIATED WITH THE AT LEAST ONE VSAN

↓

215 IDENTIFY THE UNIQUE IDENTIFIER IS ASSOCIATED WITH AT LEAST ONE OTHER VSAN

OR

216 IDENTIFY A UNIQUE IDENTIFIER ASSOCIATED WITH THE AT LEAST ONE VSAN

↓

217 DETERMINE THE UNIQUE IDENTIFIER ASSOCIATED WITH THE AT LEAST ONE VSAN, IS INVALID

*FIG. 6*

218 ANALYZE A CONFIGURATION OF THE AT LEAST ONE VSAN BY APPLYING A POLICY TO THE CONFIGURATION OF THE AT LEAST ONE VSAN

219 SPECIFY A LIMIT OF VSANS TO BE ASSOCIATED WITH AT LEAST ONE FABRIC

↓

220 IDENTIFY A PLURALITY OF VSANS ASSOCIATED WITH THE AT LEAST ONE FABRIC

↓

221 DETERMINE THE PLURALITY OF VSANS ASSOCIATED WITH THE AT LEAST ONE FABRIC EXCEEDS THE LIMIT OF VSANS TO BE ASSOCIATED WITH THE AT LEAST ONE FABRIC

OR

222 DETERMINE THE AT LEAST ONE VSAN DOES NOT CONTAIN AT LEAST ONE DEVICE CONTAINING AT LEAST ONE PORT

OR

223 IDENTIFY THAT AT LEAST ONE PORT, OPERABLE IN AN ISOLATED VSAN, IS AVAILABLE TO BE OPERABLE IN A VSAN

METHODS AND APPARATUS FOR ANALYZING VSAN CONFIGURATION

BACKGROUND

In general, a so-called storage area network (storage area network) is a collection of data storage systems that are networked via a switching fabric to a number of host computer systems. The host computers (also known as servers) of a respective storage area network access data stored in respective data storage systems on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

A developer or manager of such a network environment may install one or more distributed network-management software applications within host computers in a storage area network to manage or administer the various resources (i.e., devices, host computer systems, storage systems, applications, etc.) that operate within the storage area network. A network manager (i.e., a person) responsible for management of the network operates the network-management software application(s) to perform management tasks such as performance monitoring, network analysis and remote configuration and administration of the various components (i.e., software and hardware resources) operating within the network.

A conventional network-management software application may have several different software components that execute independently of each other on different computer systems but that collectively interoperate together to perform network management. As an example, conventional designs of SAN-management software applications can include a management station programs such as console and server processes, several agent processes that operate on remote host computers, store process and possibly other software processes.

Generally, the server process operates as a central control process within the SAN-management application and coordinates communication between the console, storage and agent processes. The console process often executes within a dedicated network-management workstation to allow a network administrator to visualize and remotely control and manage the various elements within the storage area network that are graphically represented on an interface presented by the console. The console allows the administrator to, for example, issue a command to an agent operating on a host computer within the network being managed. Agent processes execute on various host computer systems such as servers within the storage area network to manage storage area network entities (i.e., managed resources such as devices). As an example, there may be different respective agent programs specifically designed (e.g., coded) to remotely manage and control certain vendor-specific data storage systems, databases, switches, and so forth.

Agent processes receive remote management commands from the server process and apply functionality associated with those management commands to the managed resources within the storage area network for which those agents are designated to manage. Agents may receive a command, for example, to collect or discover configuration or management data concerning the network resources that those agents manage. This device discovery data collection process can happen in a scheduled or periodic manner, or in response to a command received from the management server. When agents are finished processing a command, results are returned to the store process for storage within a network-management database. The server can then access the database to view the results of the command sent to the agent process.

As noted above, a storage area network may include a number of hardware devices such as host computers, servers, data communications devices (e.g., switches, routers, etc.), network attached storage devices, proxy devices, firewall devices, and so forth that are coupled amongst each other via physical cables. Certain conventional network management applications are designed to provide a network manager with information concerning how these network resources are interrelated. For example, certain network management applications enable a network manager to configure resources in the network to form virtual storage area networks (VSANs).

VSAN technology enables a network manager to define independent VSANs in a storage area network based on sets of one or more physical switches. For example, physical storage area network switches in the storage area network, such as those manufactured by Cisco Systems, Inc. of San Jose, Calif., USA and other vendors, provide a coupling between host computer systems and corresponding storage systems. The hosts and storage systems couple to switch ports of the physical switches. Based on routing or switching of data in the physical switches, hosts are able to communicate through switch ports of the physical switches to corresponding storage systems and vice versa.

A storage area network administrator (i.e., a person) can operate conventional switch management and configuration software to create a VSAN within the switch that inter-relates or associates a selected set of switch ports coupling certain hosts to certain storage systems in order to isolate those inter-related switch ports (and hence their respectively connected hosts and storage systems) from other components (i.e., other host and storage systems) operating in the storage area network. In other words, a VSAN is a grouping of switch ports that represents a logical storage area network. From the perspective of a physical switch device, each given switch port (in a physical switch) is assigned to only one VSAN. Each VSAN may include two or more switch ports to couple host resources to corresponding storage resources of the storage area network. Thus, each VSAN is completely isolated from the other VSANs and functions as a separate and independent storage area network fabric with its own set of fabric services such as name services, zoning, routing, and so on.

If resources in a SAN such as switches, operating system, host bus adapters, storage systems, or the like are incompatible with other hardware and/or software resources present in the storage area network, then the storage area network might no longer operate properly and enable a respective user to retrieve stored data. One conventional way to ensure that a storage area network will work properly (e.g., so that the storage area network enables users to access corresponding stored data) is to provide a software application that operates as a SAN resource compatibility checker. Such applications are referred to herein as SAN advisor or network compatibility checking software applications since they can analyze a given SAN configuration and can indicate or "advise" a user (e.g. a SAN administrator) of what resources in the SAN might present compatibility problems with other resources.

SUMMARY

Conventional mechanisms and techniques for validating a storage area network suffer from a variety of deficiencies. In particular, conventional techniques that validate storage area networks are limited in that conventional techniques are error prone, inefficient, and not easily scaled for larger storage area network environments and provide no mechanism to validate VSAN configurations. In particular, conventional compatibility checking software does not validate various aspects of a VSAN when encountered in network management data.

Embodiments disclosed herein operate to significantly overcome these and other deficiencies associated with conventional mechanisms and techniques for validating VSAN configurations of storage area network. One example of a VSAN as used herein is a logical fabric. In particular, embodiments disclosed herein provide a VSAN configuration analyzing process that identifies a VSAN within a storage area network, and applies a rule (or a set of rules) to the VSAN to validate a configuration within the VSAN. The VSAN configuration analyzing process then outputs the result of the rule. Each rule is designed to test a particular configuration of a storage area network that is required when one or more VSANs are present in that storage area network. VSANs present special considerations and the system disclosed herein provides a set of rules to test these requirements to ensure that the storage area network and VSAN setup, as well as particular device configurations are proper within the storage area network to support proper VSAN operation.

A VSAN enabled switch device may have a plurality of ports. Some of the ports may be configured in a first VSAN, while the other ports may exist in a second VSAN. In other words, a switch device may have ports A, B, C, D, E, and F. Ports A, B, and C may exist in the first VSAN and as such, ports A, B, and C can communicate with each other. Ports D, E, and F may exist in the second VSAN and as such ports D, E, and F can communicate with each other. However, ports A, B and C cannot communicate with or even identify the existence of ports D, E, and F. This is the essence of a VSAN and allows partitioning of storage area network resource into multiple virtual storage area networks (VSANs).

In an example embodiment, the VSAN configuration analyzing process applies a rule (to the configuration of the VSAN) that determines that the VSAN does not contain at least one live switch within the network. The VSAN configuration analyzing process outputs the result of the rule, along with recommendations to a storage area network administrator to rectify the problem.

In other example embodiments, a rule may determine switches incorrectly assigned to multiple VSANs, duplicate identified VSANs, invalid VSANs, excessive VSANs associated with a VSAN, etc. The result of the rule may be an information statement, warning statement or error statement.

The VSAN configuration analyzing process identifies at least one VSAN within the storage area network. The VSAN configuration analyzing process identifies that the VSAN within the storage area network (SAN) has at least one device operable in multiple VSANs. The VSAN configuration analyzing process analyzes a configuration of the VSAN by applying a policy to the configuration of the VSAN. The VSAN configuration analyzing process then outputs a result of the policy that was applied to the configuration of the VSAN.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following more particular description of preferred embodiments disclosed herein, as illustrated in the accompanying drawings in which like reference characters refer to the same parts throughout the different views. The drawings are not necessarily to scale, with emphasis instead being placed upon illustrating the embodiments, principles and concepts disclosed herein.

DETAILED DESCRIPTION

Embodiments disclosed herein include a VSAN configuration analyzing process that identifies a VSAN within a storage area network, and applies a rule (or a set of rules) to the VSAN to validate a configuration within the VSAN. The VSAN configuration analyzing process then outputs the result of the rule. Each rule is designed to test a particular configuration of a storage area network that is required when one or more VSANs are present in that storage area network. VSANs present special considerations and the system disclosed herein provides a set of rules to test these requirements to ensure that the storage area network and VSAN setup, as well as particular device configurations are proper within the storage area network to support proper VSAN operation.

A VSAN enabled switch device may have a plurality of ports. Some of the ports may be configured in a first VSAN, while the other ports may exist in a second VSAN. In other words, a switch device may have ports A, B, C, D, E, and F. Ports A, B, and C may exist in the first VSAN and as such, ports A, B, and C can communicate with each other. Ports D, E, and F may exist in the second VSAN and as such ports D, E, and F can communicate with each other. However, ports A, B and C cannot communicate with or even identify the existence of ports D, E, and F. This is the essence of a VSAN and allows partitioning of storage area network resource into multiple virtual storage area networks (VSANs).

In an example embodiment, the VSAN configuration analyzing process applies a rule (to the configuration of the VSAN) that determines that the VSAN does not contain at least one live switch within the network. The VSAN configuration analyzing process outputs the result of the rule, along with recommendations to a storage area network administrator to rectify the problem.

In other example embodiments, a rule may determine switches incorrectly assigned to multiple VSANs, duplicate identified VSANs, invalid VSANs, excessive VSANs associated with a VSAN, etc. The result of the rule may be an information statement, warning statement or error statement.

The VSAN configuration analyzing process identifies at least one VSAN within the storage area network. The VSAN configuration analyzing process identifies that the VSAN within the SAN has at least one device operable in multiple VSANs. The VSAN configuration analyzing process analyzes a configuration of the VSAN by applying a policy to the configuration of the VSAN. The VSAN configuration analyzing process then outputs a result of the policy that was applied to the configuration of the VSAN.

Figure 1:
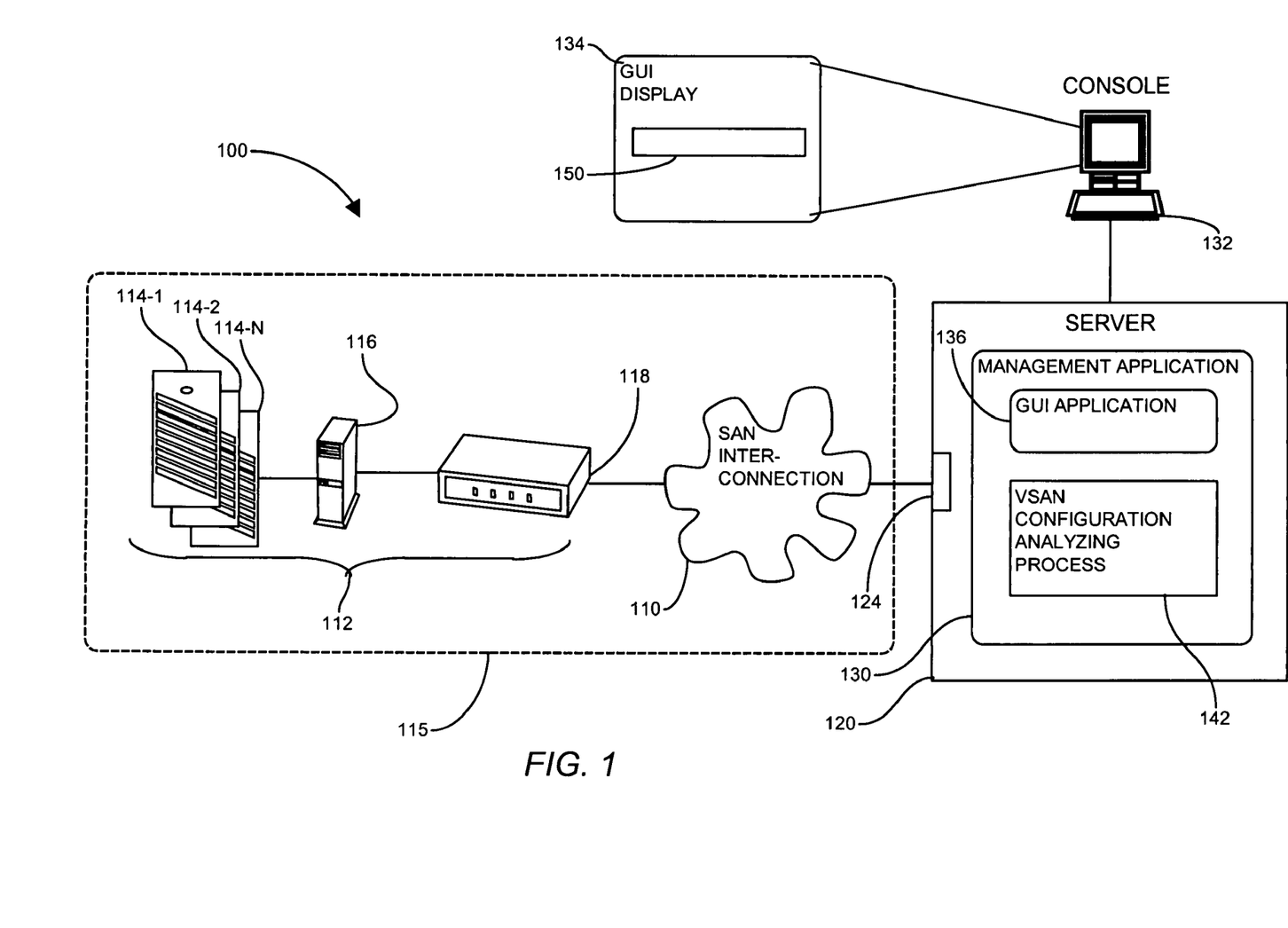
FIG. 1 illustrates an example storage area network and computing system environment including the VSAN configuration analyzing process configured to operate according to embodiments disclosed herein.

FIG. 1 displays an example managed information environment 100 employing a storage area network interconnection 110 to maintain a storage area network 115. The example storage area network 115 includes devices 112, or resources, each interconnected to define a particular storage area network 115. Each of the devices 112 is responsive to a management application 130, including the VSAN configuration analyzing process 142-2, executing on a server 120 coupled to the storage area network 115 via a storage area network interface 124. Each of the devices 112, that includes storage arrays 114-N, connectivity devices 116 and hosts 118, is manageable from a console 132 via a GUI display 134 driven by a GUI application 136 in the management application 130. The GUI display 134 is operable to display policies 150.

Figure 2:
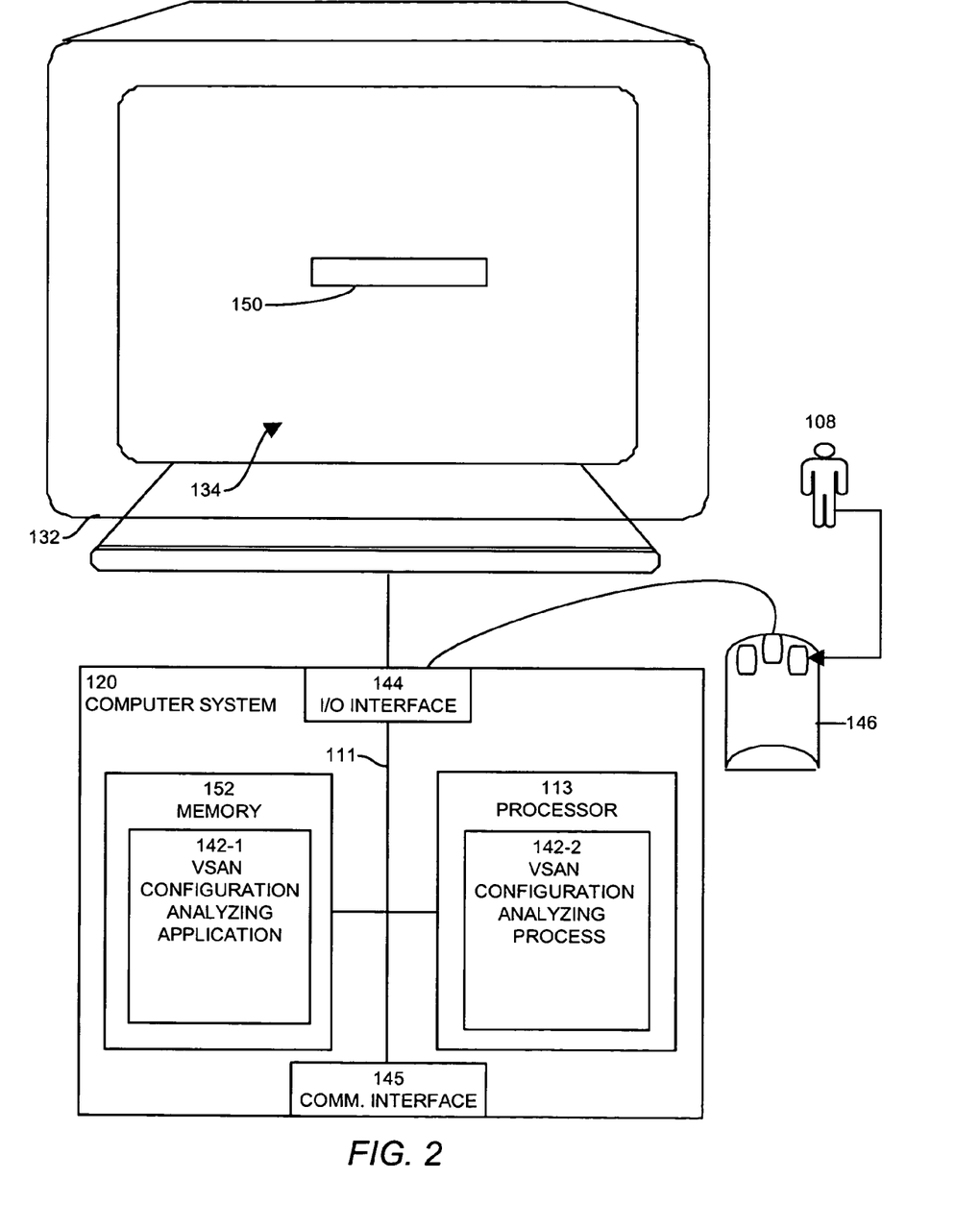
FIG. 2 illustrates an example server executing the VSAN configuration analyzing process, according to one embodiment disclosed herein.

FIG. 2 is a block diagram illustrating example architecture of a server 120 that executes, runs, interprets, operates or otherwise performs a configuration analyzing application 142-1 and process 142-2. The server 120 may be any type of computerized device such as a personal computer, workstation, portable computing device, console, laptop, network terminal or the like. As shown in this example, the server 120 includes an interconnection mechanism 111 such as a data bus or other circuitry that couples a memory system 152, a processor 113, an input/output interface 144, and a communications interface 145. An input device 146 (e.g., one or more user/developer controlled devices such as a pointing device, keyboard, mouse, etc.) couples to processor 113 through I/O interface 144, and enables a user 108, such as a storage area network administrator, to provide input commands and generally control the a console 132 that the VSAN configuration analyzing application 140-1 and process 140-2 outputs policies 150 on the GUI display 134. The communications interface 145 enables the server 120 to communicate with other devices (i.e., other computers) on a network (not shown). This can allow access to the configuration VSAN configuration analyzing application by remote computer systems.

The memory system 152 is any type of computer readable medium and in this example is encoded with a VSAN configuration analyzing application 142-1. The VSAN configuration analyzing application 142-1 may be embodied as software code such as data and/or logic instructions (e.g., code stored in the memory or on another computer readable medium such as a removable disk) that supports processing functionality according to different embodiments described herein. During operation of the server 120, the processor 113 accesses the memory system 152 via the interconnect 111 in order to launch, run, execute, interpret or otherwise perform the logic instructions of the VSAN configuration analyzing application 142-1. Execution of VSAN configuration analyzing application 142-1 in this manner produces processing functionality in a VSAN configuration analyzing process 142-2. In other words, the VSAN configuration analyzing process 142-2 represents one or more portions of runtime instances of the VSAN configuration analyzing application 142-1 (or the entire application 142-1) performing or executing within or upon the processor 113 in the server 120 at runtime.

Further details of configurations explained herein will now be provided with respect to a flow chart of processing steps that show the high level operations disclosed herein to perform the VSAN configuration analyzing process 142-2.

Figure 3:
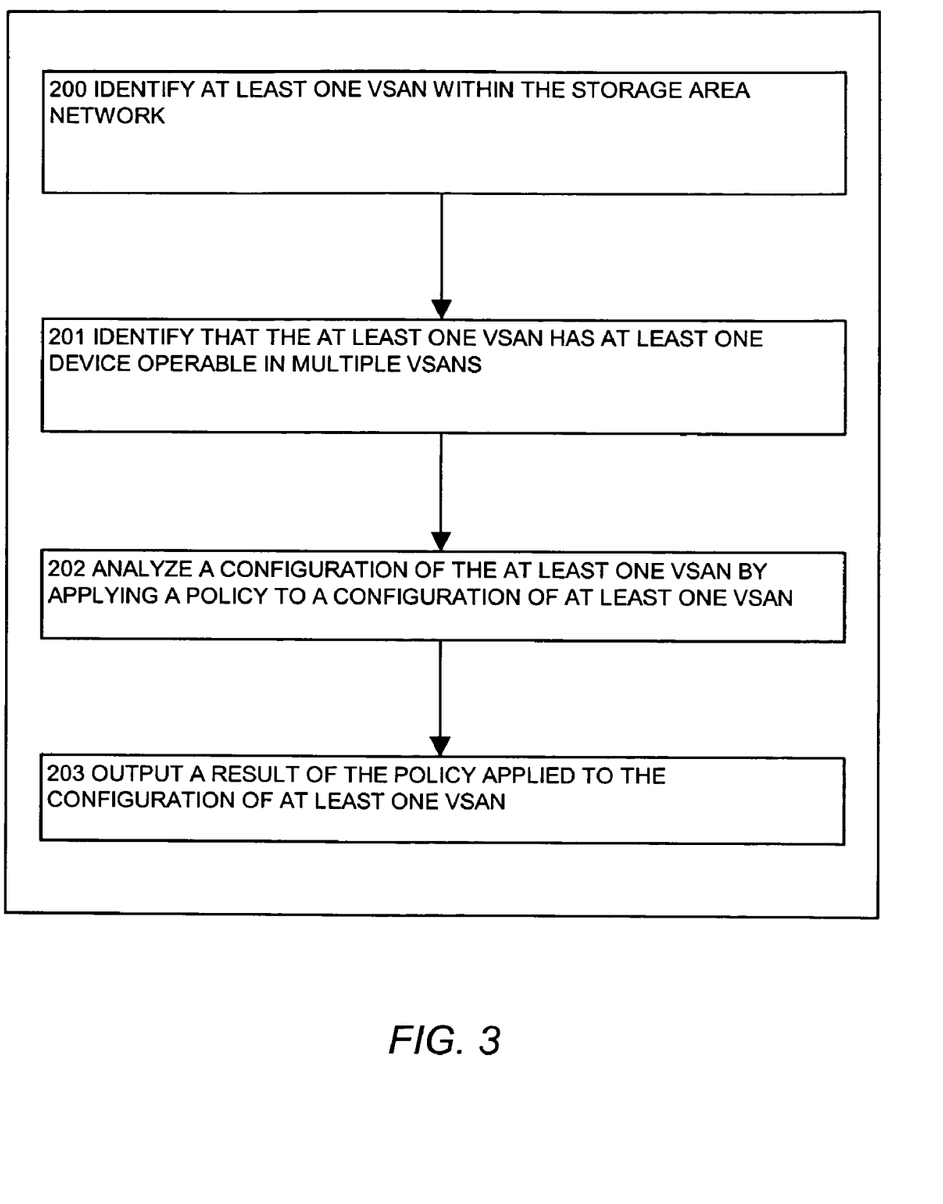
FIG. 3 illustrates an example flowchart of a procedure performed by the system of FIG. 1 when the VSAN configuration analyzing process identifies at least one VSAN within the storage area network, according to an embodiment disclosed herein.

FIG. 3 is a flowchart of the steps performed by the VSAN configuration analyzing process 142-2 when it identifies at least one VSAN within the storage area network 115.

In step 200, the VSAN configuration analyzing process 142-2 identifies at least one VSAN within the storage area network 115. Devices 112 in the storage area network 115 can be arranged into logical groups called zones. A zone is a logical set of devices 112 that can access one another. Zones help to partition the SAN by creating VSAN subsets. Zones can be present in SANs and also in VSANs. A VSAN is a part of SAN, and acts like a SAN in itself.

In step 201, the VSAN configuration analyzing process 142-2 identifies that at least one VSAN has at least one device 112 operable in multiple VSANs. In an example embodiment, a device 112 may have multiple ports, for example six ports. Two of the six ports of the device 112 may operate in a first VSAN while the remaining four of the size ports of the device 112 may operate in a second VSAN.

In step 202, the VSAN configuration analyzing process 142-2 analyzes a configuration of the VSAN by applying a policy 150 to the configuration of the VSAN. The VSAN configuration analyzing process 142-2 applies a policy 150, or rule, to the configuration of the VSAN to accurately assess the configuration of the VSAN, including attributes of the VSAN, such as name, ID, etc.

In step 203, the VSAN configuration analyzing process 142-2 outputs a result of the policy 150 applied to the configuration of the VSAN. The VSAN configuration analyzing process 142-2 renders the result of the policy 150, for example, on the console 132 via the GUI display 134 where a user 108, such as a storage area network administrator, can view the result of the policy 150, and take action to properly configure the storage area network 115.

Figure 4:
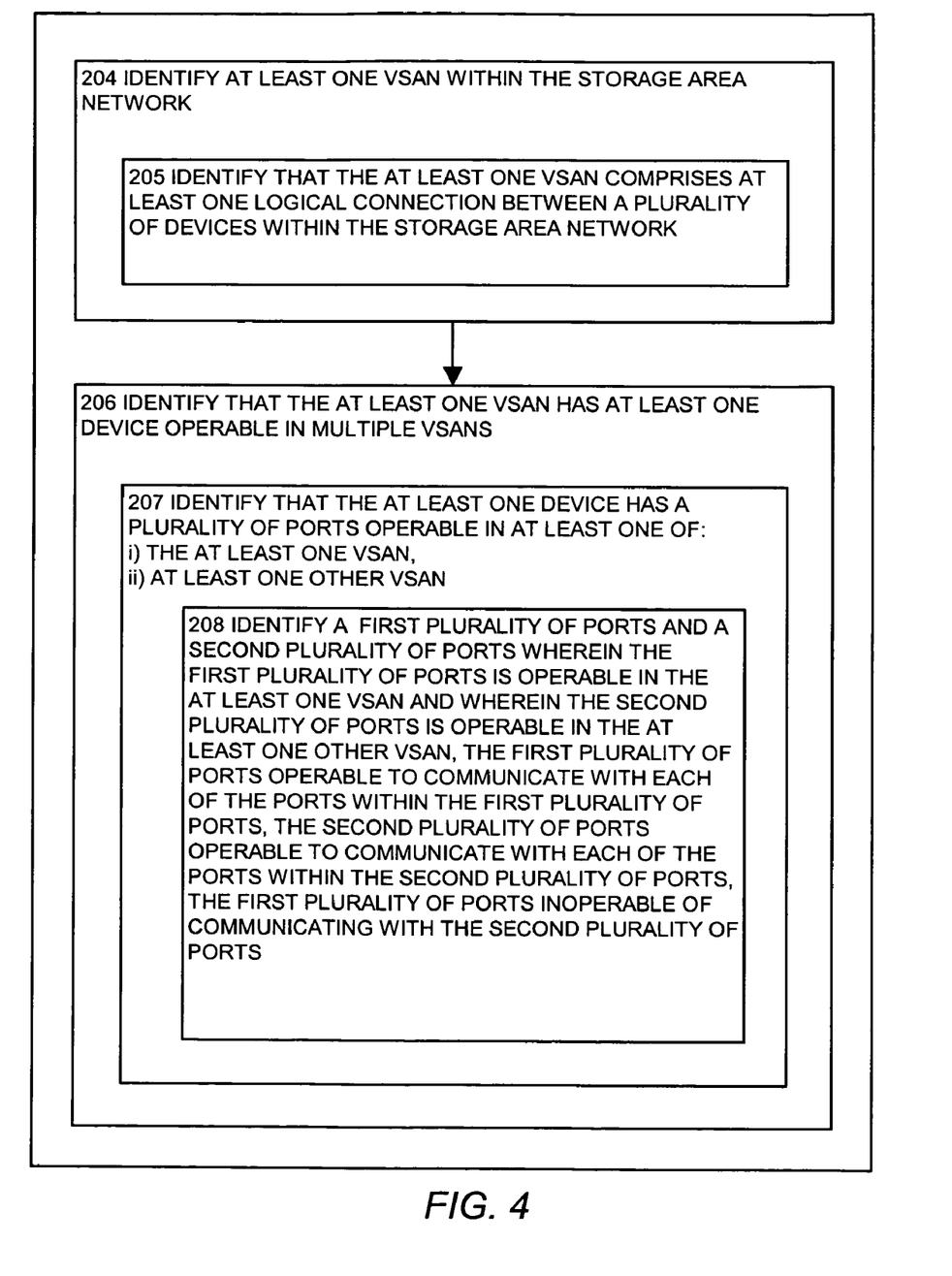
FIG. 4 illustrates an example flowchart of a procedure performed by the system of FIG. 1 when the VSAN configuration analyzing process identifies at least one VSAN within the storage area network, and identifies that the VSAN comprises at least one logical connection between a plurality of devices within the storage area network, according to an embodiment disclosed herein.

FIG. 4 is a flowchart of the steps performed by the VSAN configuration analyzing process 142-2 when it identifies at least one VSAN within the storage area network.

In step 204, the VSAN configuration analyzing process 142-2 identifies at least one VSAN within the storage area network 115. The storage area network 115 can contain a plurality of VSANs.

In step 205, the VSAN configuration analyzing process 142-2 identifies that at least one VSAN comprises at least one logical connection between a plurality of devices within the storage area network 115. The devices 112 within the storage area network 115 have physical connections. The manner in which the devices 112 operate with respect to other devices 112 within the storage area network 115 depicts the logical connections between those devices 112.

In step 206, the VSAN configuration analyzing process 142-2 identifies that at least one VSAN has at least one device 112 operable in multiple VSANs. A VSAN may contain a plurality of devices 112. Each of those devices 112 may operate in one or more VSANs.

In step 207, the VSAN configuration analyzing process 142-2 identifies that at least one device 112 has a plurality of ports operable in at least one of:

i) at least one VSAN, and ii) at least one other VSAN.

In an example embodiment, the device 112 has a plurality of ports. Some of the ports may operate in a first VSAN, and some of the other ports may operate in a second VSAN.

In step 208, the VSAN configuration analyzing process 142-2 identifies a first plurality of ports and a second plurality of ports. The first plurality of ports is may operate in at least one VSAN, and the second plurality of ports may operate in at least one other VSAN. The first plurality of ports is operable to communicate with each of the ports within the first plurality of ports. The second plurality of ports is operable to communicate with each of the ports within the second plurality of ports. However, the first plurality of ports is inoperable of communicating with the second plurality of ports. A device may have a plurality of ports. Some of the ports may exist in a first VSAN, while the other ports may exist in a second VSAN. In other words, a device may have ports A, B, C, D, E, and F. Ports A, B, and C may exist in the first VSAN. Ports A, B, and C can communicate with each other. Ports D, E, and F may exist in the second VSAN. Ports D, E, and F can communicate with each other. However, ports A, B and C cannot communicate with ports D, E, and F.

Figure 5:
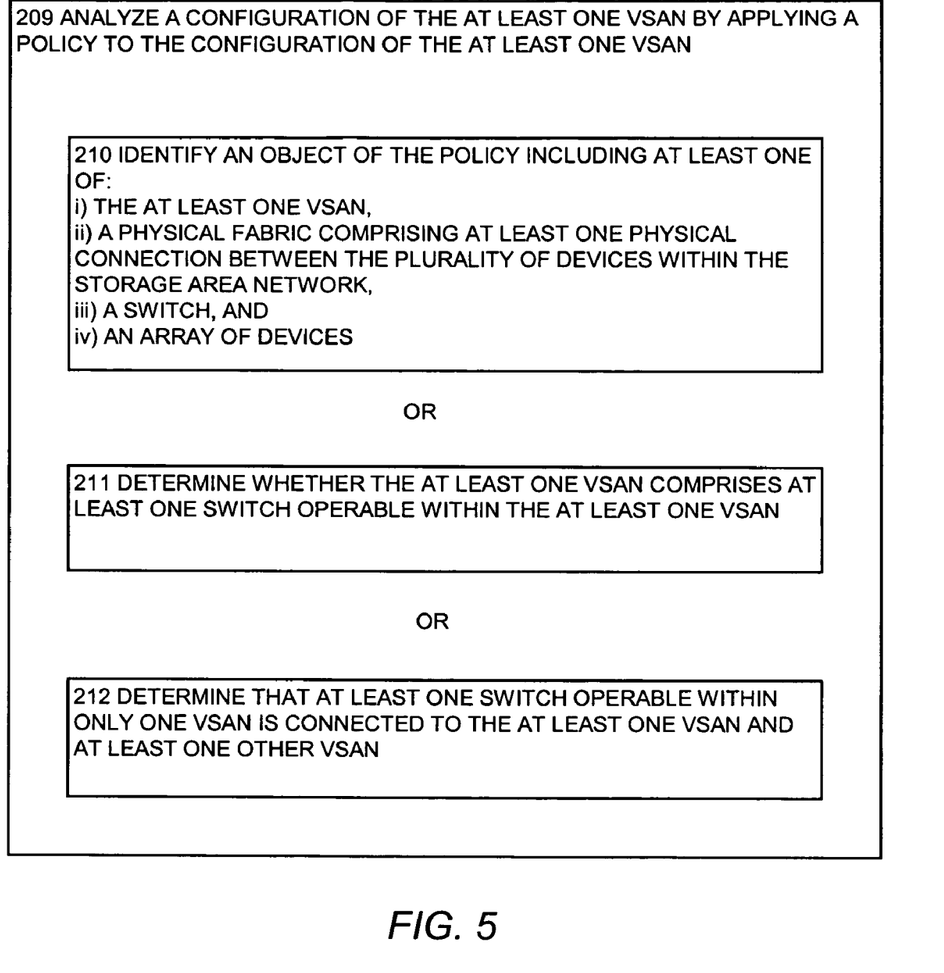
FIG. 5 illustrates an example flowchart of a procedure performed by the system of FIG. 1 when the VSAN configuration analyzing process analyzes a configuration of the VSAN by applying a policy to the configuration of the VSAN, according to an embodiment disclosed herein.

FIG. 5 is a flowchart of the steps performed by the VSAN configuration analyzing process 142-2 when it analyzes a configuration of at least one VSAN by applying a policy 150 to a configuration of at least one VSAN.

In step 209, the VSAN configuration analyzing process 142-2 analyzes a configuration of the VSAN by applying a policy 150 to the configuration of the VSAN. The VSAN configuration analyzing process 142-2 applies a policy 150, or rule, to the VSAN to accurately assess the configuration of the VSAN, including attributes of the VSAN, such as name, ID, etc.

In step 210, the VSAN configuration analyzing process 142-2 identifies an object of the policy 150 including at least one of:

i) at least one VSAN, ii) a physical fabric comprising at least one physical connection between the plurality of devices 112 within the storage area network 115, iii) a switch, and iv) an array of devices 112.

In an example embodiment, the rule can apply to more than one different objects.

For example, policy 150 may specify a VSAN, a physical fabric and a switch as objects of that policy 150.

Alternatively, in step 211, the VSAN configuration analyzing process 142-2 determines whether at least one VSAN includes at least one switch operable within at least one VSAN. In an example embodiment, the VSAN configuration analyzing process 142-2 notifies a user 108, such as a storage area network advisor, that switches incapable of being connected to more than one VSAN, such as a VSAN, are connected to more than one VSAN.

An example error message displayed on the GUI display 134 on the console 132 may read:

The fabric ${SiteSlash}${PhysicalFabricName} has VSANs enabled, but none of the switches in it are VSAN capable. Add a VSAN capable switch or turn off VSANs.

The following fabrics have VSANs enabled, but none of the switches in them are VSAN capable. Add VSAN capable switches or turn off VSANs.

In an example embodiment, identifiers of components of the VSAN are represented by variables (such as ${SiteSlash}). The VSAN configuration analyzing process 142-2 dynamically generates the proper value in place of the variable, at the time the VSAN configuration analyzing process 142-2 outputs the policy 150. In this example, the variable ${SiteSlash}$PhysicalFabricName} represents an identifier of the Fabric. SiteSlash represents the site name (SAN Advisor can support multiple sites), and PhysicalFabricName represents the fabric name.

Alternatively, in step 212, the VSAN configuration analyzing process 142-2 determines that at least one switch operable within only one VSAN, such as a VSAN, is connected to the at least one VSAN, and at least one other VSAN An example error message displayed on the GUI display 134 on the console 132 may read:

> The switch ${SwitchName} (${SwitchModel}) in fabric ${SiteSlash}${PhysicalFabricName} is connected to ports in ${NumVSANs} VSANs: ${VSANList}. Since this switch is not VSAN capable, it can only be connected to the ports in a single VSAN. Reconfigure the ports of the VSAN or make sure this switch is connected to ports in one VSAN only.

> The following non-VSAN capable switches are connected to ports in more than one VSAN. Since they are not VSAN capable, they can only be connected to the ports in a single VSAN. Reconfigure the ports of the VSANs or make sure the switches are connected to ports in one VSAN only.

Figure 6:
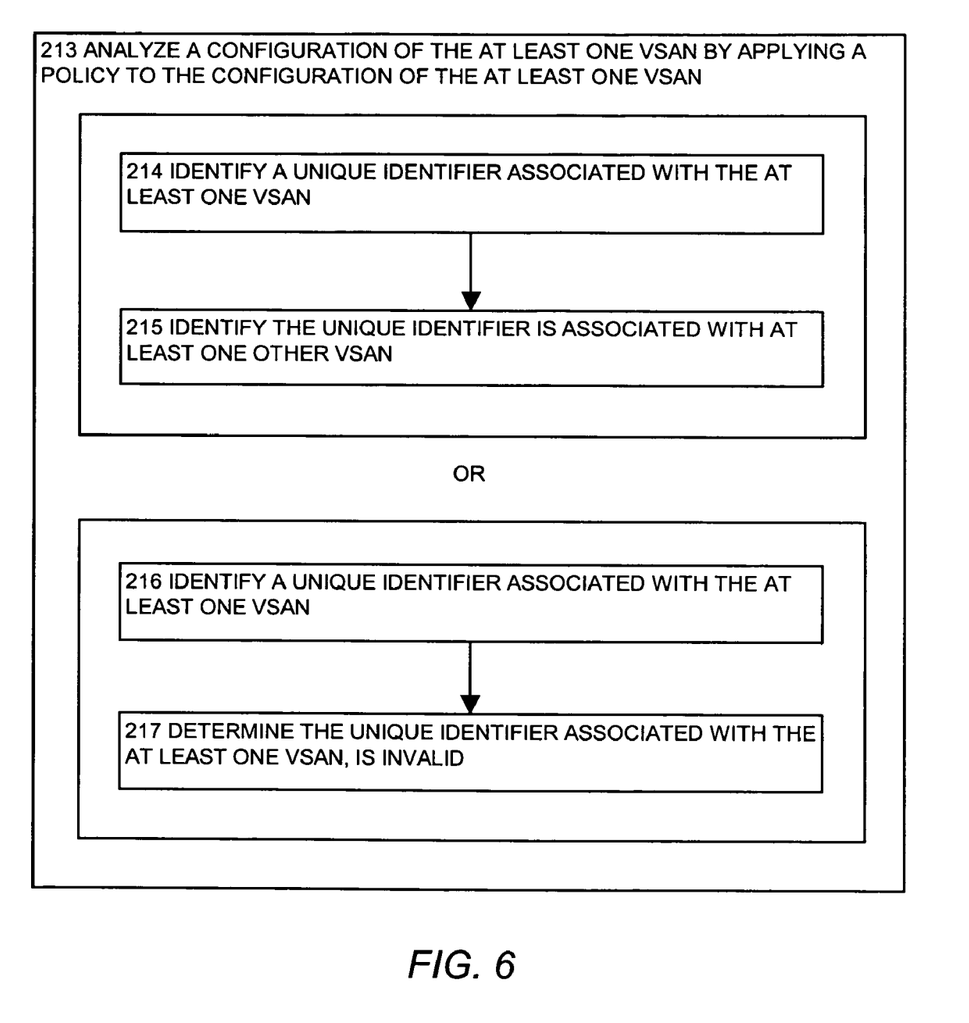
FIG. 6 illustrates an example flowchart of a procedure performed by the system of FIG. 1 when the VSAN configuration analyzing process analyzes a configuration of at least one VSAN by applying a policy to a configuration of at least one VSAN, and identifies a unique identifier associated with at least one VSAN, according to an embodiment disclosed herein.

FIG. 6 is a flowchart of the steps performed by the VSAN configuration analyzing process 142-2 when it analyzes a configuration of at least one VSAN by applying a policy 150 to the configuration of the VSAN.

In step 213, the VSAN configuration analyzing process 142-2 analyzes a configuration of the VSAN by applying a policy 150 to the configuration of the VSAN. The VSAN configuration analyzing process 142-2 applies a policy 150, or rule, to the VSAN to accurately assess the configuration of the VSAN, including attributes of the VSAN, such as name, ID, etc.

In step 214, the VSAN configuration analyzing process 142-2 identifies a unique identifier associated with at least one VSAN. The unique identifier may be, for example, a VSAN name or a VSAN identifier.

In step 215, the VSAN configuration analyzing process 142-2 identifies the unique identifier is associated with at least one other VSAN. In an example embodiment, the VSAN configuration analyzing process 142-2 determines more than one VSAN, such as a VSAN, is identified by the same unique identifier.

An example error message displayed on the GUI display 134 on the console 132 may read:

> Fabric ${SiteSlash}${PhysicalFabricName} contains multiple VSANs with the same VSAN ID of ${VSANID}: ${VSANNameList}. Make sure the VSANs have unique VSAN IDs.

> The VSANs below have the same VSAN ID. Make sure the VSANs have unique VSAN IDs.

Another example warning message displayed on the GUI display 134 on the console 132 may read:

> Fabric ${SiteSlash}${PhysicalFabricName} has more than one VSANs named ${LogicalFabricName}. Make sure the VSANs have unique names.

> The fabrics below have more than one VSAN with the same name. Make sure the VSANs have unique names.

Alternatively, in step 216, the VSAN configuration analyzing process 142-2 identifies a unique identifier associated with the at least one VSAN. The unique identifier may be, for example, a VSAN name or a VSAN identifier.

In step 217, the VSAN configuration analyzing process 142-2 determines that the unique identifier associated with the at least one VSAN, such as a VSAN, is invalid.

An example error message displayed on the GUI display 134 on the console 132 may read:

> Fabric ${SiteSlash}${PhysicalFabricName} VSAN ${LogicalFabricName} has an invalid VSAN ID of ${VSANID}. Make sure the VSAN ID is between 1 and 4093 (inclusive). VSAN ID 4094 is reserved for the isolated VSAN.

> The VSANs below have invalid VSAN IDs. Make sure the VSAN ID is between 0 and 1095 (inclusive). VSAN ID 1096 is reserved for the isolated VSAN.

Another example warning message displayed on the GUI display 134 on the console 132 may read:

> Fabric ${SiteSlash}${PhysicalFabricName} VSAN ${LogicalFabricName} has an invalid VSAN name. Make sure the VSAN name is 1 to 32 characters long, contains the 4 digit VSAN ID and is of the standard format (e.g. VSAN0001).

> The VSANs below have invalid VSAN names. Make sure the VSAN name is 1 to 32 characters long, contains the 4 digit VSAN ID and is of the standard format (e.g. VSAN0001).

Figure 7:
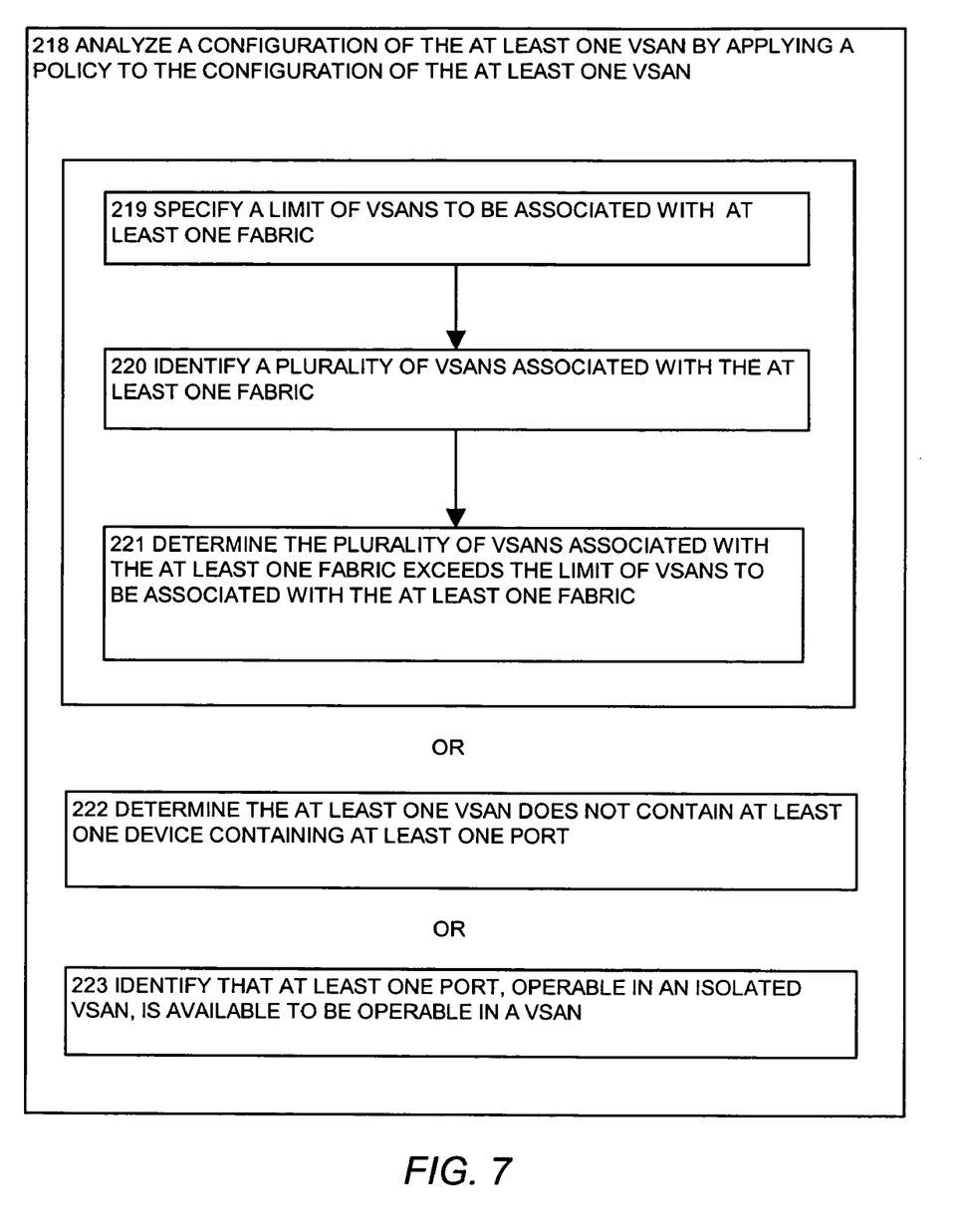
FIG. 7 illustrates an example flowchart of a procedure performed by the system of FIG. 1 when the VSAN configuration analyzing process analyzes a configuration of at least one VSAN by applying a policy to a configuration of at least one VSAN, and specifies a limit of VSANs to be associated with at least one VSAN, according to an embodiment disclosed herein.

FIG. 7 is a flowchart of the steps performed by the VSAN configuration analyzing process 142-2 when it analyzes a configuration of at least one VSAN by applying a policy 150 to the configuration of the VSAN.

In step 218, the VSAN configuration analyzing process 142-2 analyzes a configuration of the VSAN by applying a policy 150 to the configuration of the VSAN. The VSAN configuration analyzing process 142-2 applies a policy 150, or rule, to the VSAN to accurately assess the configuration of the VSAN, including attributes of the VSAN, such as name, ID, etc.

In step 219, the VSAN configuration analyzing process 142-2 specifies a limit of VSANs, such as VSANs, to be associated with the at least one VSAN. For example, a provider of VSANs may specify a maximum number of VSANs, that are to be associated with a fabric. However, the VSAN configuration analyzing process 142-2 also specifies a maximum number of VSANs. The maximum number (of VSANs to be associated with a fabric) provided by the VSAN configuration analyzing process 142-2 may be a different maximum number than specified by the provider of VSANs.

In step 220, the VSAN configuration analyzing process 142-2 identifies a plurality of VSANs associated with the at least one VSAN. In an example embodiment, the VSAN configuration analyzing process 142-2 compares the number of VSANs associated with a VSAN with the maximum number of provided by the VSAN configuration analyzing process 142-2.

In step 221, the VSAN configuration analyzing process 142-2 determines the plurality of VSANs associated with at least one VSAN exceeds the limit of VSANs to be associated with at least one fabric. The VSAN configuration analyzing process 142-2 outputs a policy 150 indicating that the plurality of VSANs associated with at least one VSAN exceeds the limit of VSANs to be associated with at least one fabric.

An example information message displayed on the GUI display 134 on the console 132 may read:

> Fabric ${SiteSlash}${PhysicalFabricName} contains ${NumVSANs} VSANs, which exceeds the maximum of ${MaxVSANs} recommended by EMC. Reduce the number of VSANs in the fabric.

> The following fabrics contain more VSANs than the EMC recommendation of $ {MaxVSANs}. Reduce the number of VSANs in the fabric.

Alternatively, in step 222, the VSAN configuration analyzing process 142-2 determines that at least one VSAN does not contain at least one device 112 containing at least one port.

An example information message displayed on the GUI display 134 on the console 132 may read:

> Fabric ${SiteSlash}${PhysicalFabricName} VSAN ${LogicalFabricName} is empty. Add ports to the VSAN or remove it. The VSANs below are empty. Add ports to the VSANs or remove them.

Alternatively, in step 223, the VSAN configuration analyzing process 142-2 identifies that at least one port, operable in an isolated VSAN, is available to be operable in a VSAN. In an example embodiment, the ports in an isolated VSAN are available for use in a VSAN.

An example information message displayed on the GUI display 134 on the console 132 may read:

Fabric ${SiteSlash}${PhysicalFabricName} has ports in the isolated VSAN. Use them by moving them into other VSANs.

The fabrics below have ports in the isolated VSAN. Use them by moving them into other VSANs.

Figure 8:
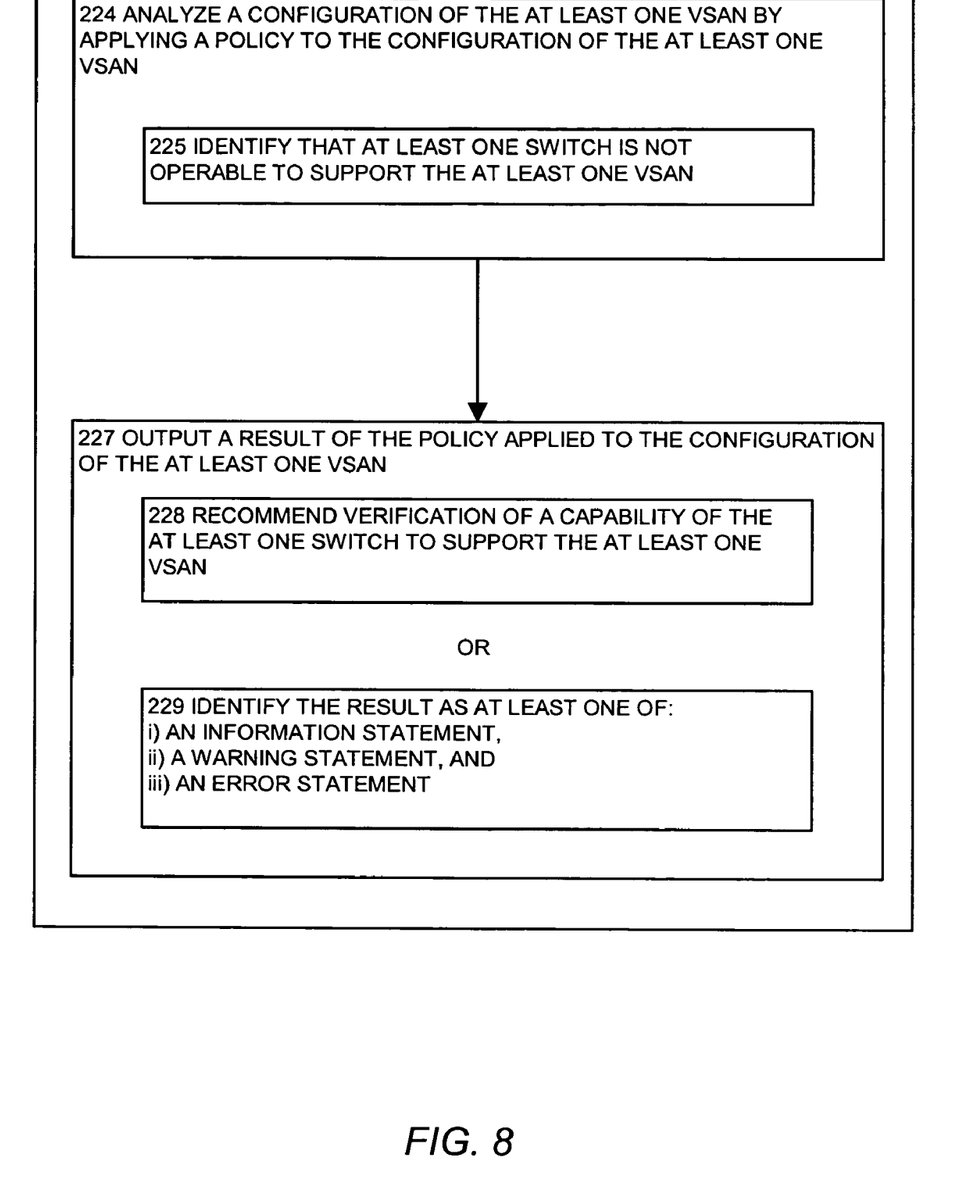
FIG. 8 illustrates an example flowchart of a procedure performed by the system of FIG. 1 when the VSAN configuration analyzing process analyzes a configuration of at least one VSAN by applying a policy to a configuration of at least one VSAN, and identifies that at least one switch is not operable to support at least one VSAN, according to an embodiment disclosed herein.

FIG. 8 is a flowchart of the steps performed by the VSAN configuration analyzing process 142-2 when it analyzes a configuration of at least one VSAN by applying a policy 150 to the configuration of the VSAN.

In step 224, the VSAN configuration analyzing process 142-2 analyzes a configuration of the VSAN by applying a policy 150 to the configuration of the VSAN. The VSAN configuration analyzing process 142-2 applies a policy 150, or rule, to the VSAN to accurately assess the configuration of the VSAN, including attributes of the VSAN, such as name, ID, etc.

In step 225, the VSAN configuration analyzing process 142-2 identifies that at least one switch is not operable to support at least one VSAN. In an example embodiment, the VSAN configuration analyzing process 142-2 identifies a switch that is determined not to be capable of supporting a VSAN.

In step 227, the VSAN configuration analyzing process 142-2 outputs a result of the policy 150 applied to a configuration of the VSAN. In an example embodiment, the VSAN configuration analyzing process 142-2 outputs the result of the policy 150 on the GUI display 134 on a console 132. The policy 150 may provide a policy number, a severity level of the policy 150, a category, and one or more objects of the policy 150.

In step 228, the VSAN configuration analyzing process 142-2 recommends verification of a capability of at least one switch to support the VSAN. An example information message displayed on the GUI display 134 on the console 132 may read:

SAN Advisor is unable to verify that the switch named ${SiteSlash}${SwitchName} can support VSANs because ${SwitchModel} is not in the EMC Support Matrix. Verify that this switch can support VSANs manually.

SAN Advisor is unable to verify VSAN support for the following switches because they are not in the EMC Support Matrix. Verify that these switches can support VSANs manually.

Alternatively, in step 229, the VSAN configuration analyzing process 142-2 identifies the result as at least one of an information statement, warning statement, and an error statement. In an example embodiment, each policy 150 has an associated severity level. The severity level may be identified as an information statement, warning statement, or error statement.

Other alternative arrangements disclosed herein include rearranging the processing steps explained above in the flow charts in such a way that the overall effect disclosed herein is the same. It is to be thus understood by those skilled in the art that the particular arrangement of processing steps in many instances does not specify implementation of embodiments disclosed herein. As such, those skilled in the art of software development and computer-related technologies will understand that there can be many ways and orders of representing the processing operations explained above and such alternative software code will still achieve the overall effects explained herein. In addition, embodiments disclosed herein are not limited to operation on the computer systems shown above. Furthermore, embodiments disclosed herein are not limited to operation in a storage area network management application, but are intended to be generally applicable to any type of network management application. Accordingly, embodiments disclosed herein are not limited to the processing arrangements explained above.

Other arrangements of embodiments disclosed herein that are disclosed herein include software programs to perform the method embodiment steps and operations summarized above and disclosed in detail below for the store process. More particularly, a computer program product is disclosed that has a computer-readable medium including computer program logic encoded thereon that when performed in a computerized device provides a associated operations of the store process, as explained herein. The computer program logic, when executed on at least one processor with a computing system, causes the processor to perform the operations (e.g., the methods) indicated herein as embodiments disclosed herein. Such arrangements disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments disclosed herein.

Software processes that operate in a collection of computerized devices, such as in a group of storage area network management servers, hosts or other entities can also provide the system disclosed herein. The system disclosed herein can be distributed between many software processes on several computers, or all processes such as the agent and store process could execute on a small set of dedicated computers, or on one computer alone.

It is to be understood that the system disclosed herein can be embodied strictly as a software program, as software and hardware, or as hardware alone. Example embodiments disclosed herein may be implemented within EMC's Control Center software application that provides management functionality for storage area network resources and in computerized devices that operate the Control Center software. Control Center is manufactured by EMC Corporation of Hopkinton, Mass., USA.

What is claimed is:

1. A method of analyzing VSAN compatibility within a storage area network, the method comprising:
    identifying at least one Virtual Storage Area Network (VSAN) within the storage area network (SAN);
    analyzing a configuration of the at least one VSAN by applying a policy to the configuration of that at least one VSAN; and
    outputting a result of the policy applied to the configuration of the at least one VSAN;
    wherein analyzing the configuration of the at least one VSAN by applying the policy to the configuration of the at least one VSAN comprises: identifying that at least one switch is not operable to support the at least one VSAN;

wherein analyzing the configuration of the at least one VSAN by applying the policy to the configuration of the at least one VSAN further comprises:
specifying a limit of VSANs to be associated with at least one fabric;
identifying a plurality of VSANs associated with the at least one fabric; and
determining the plurality of VSANs exceeds the limit of VSANs;
wherein outputting the result of the policy applied to the configuration of the at least one VSAN comprises: recommending verification of a capability of the at least one switch to support the at least one VSAN.

2. The method of claim 1 wherein identifying the at least one VSAN within the storage area network comprises:
identifying that the configuration of the at least one VSAN comprises at least one logical connection between a plurality of devices within the storage area network.

3. The method of claim 1 comprising:
identifying that the configuration of the at least one VSAN has at least one switch operable in multiple VSANs; and
wherein identifying that the configuration of the at least one VSAN has the at least one switch operable in multiple VSANs comprises:
identifying that the at least one switch has a plurality of ports operable in at least one of:
i) the at least one VSAN; and
ii) at least one other VSAN.

4. The method of claim 3 wherein identifying that the at least one switch has the plurality of ports comprises:
identifying a first plurality of ports and a second plurality of ports wherein the first plurality of ports is operable in the at least one VSAN and wherein the second plurality of ports is operable in the at least one other VSAN, the first plurality of ports operable to communicate with each of the ports within the first plurality of ports, the second plurality of ports operable to communicate with each of the ports within the second plurality of ports, the first plurality of ports inoperable of communicating with the second plurality of ports.

5. The method of claim 1 wherein analyzing the configuration of the at least one VSAN by applying the policy to the configuration of the at least one VSAN comprises:
identifying an object of the policy including at least one of:
i) the at least one VSAN;
ii) a physical fabric comprising at least one physical connection between the plurality of devices within the storage area network;
iii) the at least one switch; and
iv) an array of devices.

6. The method of claim 1 wherein analyzing the configuration of the at least one VSAN by applying the policy to the configuration of the at least one VSAN comprises:
determining whether the configuration of the at least one VSAN includes at least one VSAN-enabled switch operable within the at least one VSAN.

7. The method of claim 1 wherein analyzing the configuration of the at least one VSAN by applying the policy to the configuration of the at least one VSAN comprises:
determining that at least one switch operable within only one VSAN is connected to the at least one VSAN and at least one other VSAN.

8. The method of claim 1 wherein analyzing the configuration of the at least one VSAN by applying the policy to the configuration of the at least one VSAN comprises:
identifying a unique identifier associated with the at least one VSAN; and
identifying the unique identifier is associated with at least one other VSAN.

9. The method of claim 1 wherein analyzing the configuration of the at least one VSAN by applying the policy to the configuration of the at least one VSAN comprises:
identifying a unique identifier associated with the at least one VSAN; and
determining the unique identifier associated with the at least one VSAN, is invalid.

10. The method of claim 1 wherein analyzing the configuration of the at least one VSAN by applying the policy to the configuration of the at least one VSAN comprises:
determining the at least one VSAN does not contain at least one device containing at least one port.

11. The method of claim 1 wherein analyzing the configuration of the at least one VSAN by applying the policy to the configuration of the at least one VSAN comprises:
identifying that at least one port, operable in an isolated VSAN, is available to be operable in a VSAN.

12. The method of claim 1 wherein outputting the result of the policy applied to the configuration of the at least one VSAN comprising:
identifying the result as at least one of:
i) an information statement;
ii) a warning statement; and
iii) an error statement.

13. A computerized device comprising:
a memory;
a processor;
a communications interface;
an interconnection mechanism coupling the memory, the processor and the communications interface;
wherein the memory is encoded with a Virtual Storage Network (VSAN) configuration analyzing application that when executed on the processor is capable of analyzing VSAN configurations on the computerized device by performing the operations of:
identifying at least one VSAN within the storage area network;
analyzing a configuration of the at least one VSAN by applying a policy to the configuration of that at least one VSAN; and
outputting a result of the policy applied to the configuration of the at least one VSAN;
wherein analyzing the configuration of the at least one VSAN by applying the policy to the configuration of the at least one VSAN comprises: identifying that at least one switch is not operable to support the at least one VSAN;
wherein when the computerized device performs the operation of analyzing the configuration of the at least one VSAN by applying the policy to the configuration of the at least one VSAN, the computerized device performs the operations of:
specifying a limit of VSANs to be associated with at least one fabric;
identifying a plurality of VSANs associated with the at least one fabric; and
determining the plurality of VSANs exceeds the limit of VSANs;
wherein outputting the result of the policy applied to the configuration of the at least one VSAN comprises: recommending verification of a capability of the at least one switch to support the at least one VSAN.

14. The computerized device of claim 13 wherein when the computerized device performs the operation of analyzing the configuration of the at least one VSAN by applying the policy to the configuration of the at least one VSAN, the computerized device performs the operations of:
    identifying an object of the policy including at least one of:
        i) the at least one VSAN;
        ii) a physical fabric comprising at least one physical connection between the plurality of devices within the storage area network;
        iii) the at least one switch; and
        iv) an array of devices.

15. A non-transitory computer readable medium encoded with computer programming logic that when executed on a process in a computerized device analyzes Virtual Storage Network (VSAN) configurations, the medium comprising:
    instructions for identifying at least one VSAN within the storage area network;
    instructions for analyzing a configuration of the at least one VSAN by applying a policy to the configuration of that at least one VSAN; and
    instructions for outputting a result of the policy applied to the configuration of the at least one VSAN;
    wherein the instructions for analyzing the configuration of the at least one VSAN by applying the policy to the configuration of the at least one VSAN comprise: instructions for identifying that at least one switch is not operable to support the at least one VSAN;
    wherein the instructions for analyzing the configuration of the at least one VSAN by applying the policy to the configuration of the at least one VSAN further comprise:
        instructions for specifying a limit of VSANs to be associated with at least one fabric;
        instructions for identifying a plurality of VSANs associated with the at least one fabric; and
        instructions for determining the plurality of VSANs exceeds the limit of VSANs;
    wherein the instructions for outputting the result of the policy applied to the configuration of the at least one VSAN comprise: instructions for recommending verification of a capability of the at least one switch to support the at least one VSAN, the computer readable medium being an non-transitory signal.

16. The method of claim 1 wherein outputting the result of the policy applied to the configuration of the at least one VSAN comprises:
    rendering the result on a graphical user interface for viewing by a user; and
    providing a capability for the user to configure the storage area network.

17. The method of claim 1 wherein outputting the result of the policy applied to the configuration of the at least one VSAN comprises:
    identifying the result and selecting from a group consisting of:
        i) a policy number;
        ii) a severity level of the policy;
        iii) a category; and
        iv) at least one object of the policy.

18. The method of claim 1, wherein recommending verification of the capability of the at least one switch to support the at least one VSAN includes:
    creating a displayable prompt indicating that a level of success with regard to ascertaining the capability of the switch, wherein the displayable prompt provides a recommendation to manually assess the capability of the switch; and
    rendering the displayable prompt in a graphical user interface.

19. The method as in claim 1, wherein identifying the at least one Virtual Storage Area Network (VSAN) within the storage area network (SAN) includes:
    identifying at least one VSAN which is included as part of the plurality of VSANs associated with the at least one fabric.

\* \* \* \* \*